United States Patent Office.

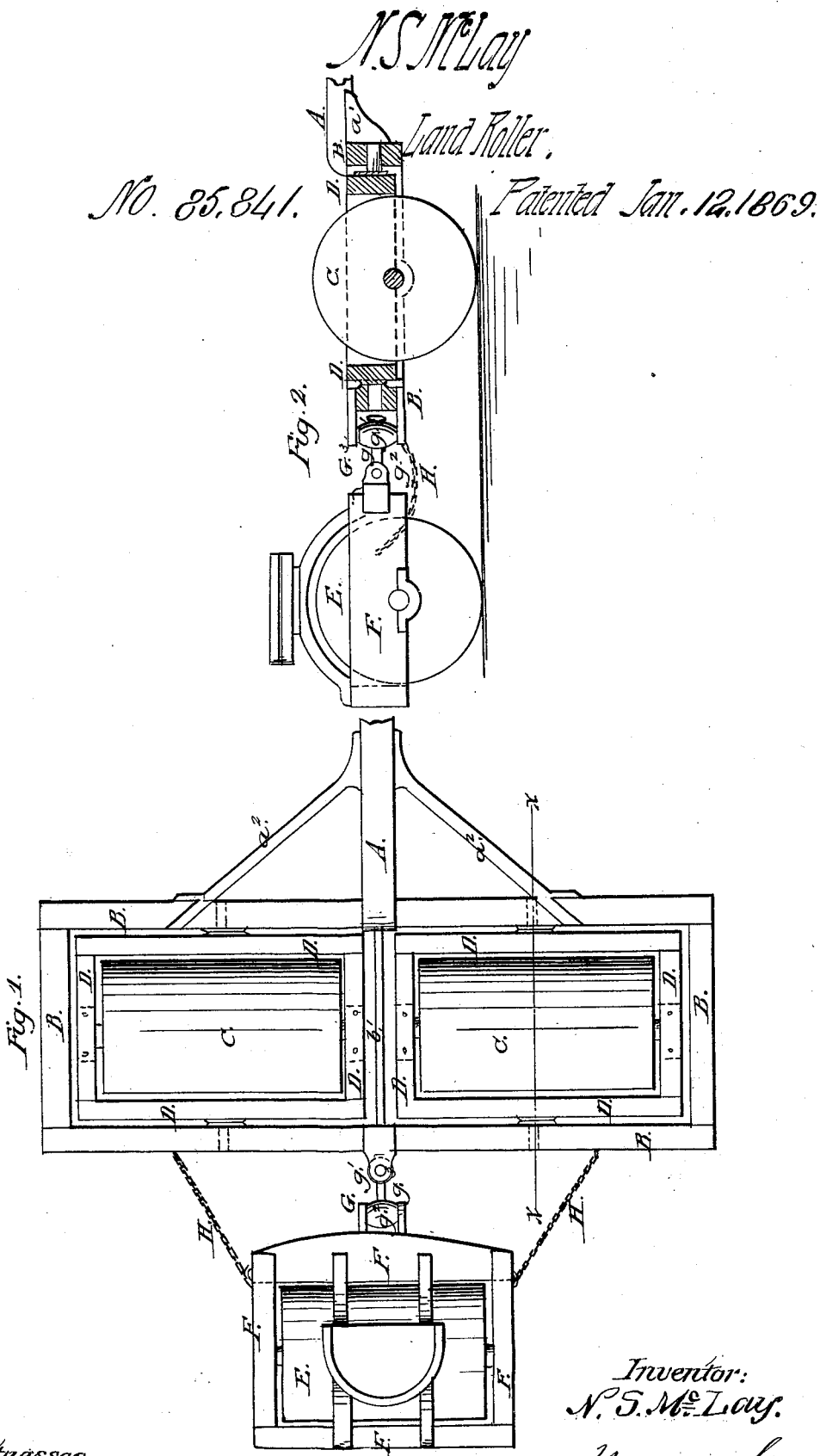

NEAL S. McLAY, OF OLATHE, KANSAS.

Letters Patent No. 85,841, dated January 12, 1869

IMPROVEMENT IN LAND-ROLLERS.

The Schedule referred to in these Letters Patent and making part of the same.

*To all whom it may concern:*

Be it known that I, NEAL S. McLAY, of Olathe, in the county of Johnson, and State of Kansas, have invented a new and useful Improvement in Land-Rollers; and I do hereby declare that the following is a full, clear, and exact description thereof, which will enable those skilled in the art to make and use the same, reference being had to the accompanying drawings, forming part of this specification, in which—

Figure 1 is a top or plan view of my improved roller.

Figure 2 is a detail vertical section of the same, taken though the line $x\,x$, fig. 1.

Similar letters of reference indicate corresponding parts.

My invention has for its object to furnish an improved land roller, which shall be so constructed and arranged that the rollers may adapt themselves to rough or uneven ground, so that the entire surface of said ground may be suitably rolled; and It consists in the construction and combination of various parts of the roller, as hereinafter more fully described.

A is the tongue, which is attached to the frame B by an iron connecting-piece, $a^1$, and which is also strengthened by the braces $a^2$, as shown in fig. 1.

The main or forward roller-frame B is made rectangular in form, and its front and rear side-bars are connected and supported at their middle points by the long bolt or bar $b'$, as shown in fig. 1.

C are the front rollers or cylinders, the journals of which revolve in bearings in the end of the frames D, which are made of such a size as to fit loosely into the frame B at the same time that the rollers or cylinders C fit loosely into them, as shown in figs. 1 and 2.

The frames D are pivoted, at the central points of their front and rear side-bars, to the front and rear side-bars of the frame B, as shown in figs. 1 and 2.

This construction enables the rollers or cylinders C to adapt themselves to the surface of the ground, should said surface be rough or uneven, so that all the ground may be suitably rolled.

As thus arranged, there will be a space of a foot, more or less, between the adjacent ends of the rollers C.

The ground thus left unrolled is rolled by the rear roller E, the journals of which revolve in bearings in the end-bars of the frame F, as shown in figs. 1 and 2.

The middle point of the front side-bar of the frame F is connected to the middle point of the rear side-bar of the frame B, by the connection G, or equivalent connection, in such a way that the frame F and roller E may have a vertical, lateral, and rocking or oscillating movement, enabling the said roller to adjust itself to the surface of the ground to be rolled.

The connection G is constructed as follows:

A small block or roller, $g^1$, is pivoted in a vertical position to ears attached to the middle part of the rear side bar of the frame B, and a similar block or roller, $g^2$, is pivoted in a horizontal position to ears attached to the middle part of the front side-bar of the frame F.

The blocks or rollers $g^1$ and $g^2$ are connected to each other by a short bolt, $g^3$, which should be swivelled to one or both of the said blocks or rollers $g^1\,g^2$, so that the said connection may form a universal joint, allowing the roller E and frame F to take any position that the surface of the ground may require.

The frame F is also connected to the frame B by two chains, H, which should be of such a length that when the machine is drawn forward in a straight line, the chains H may both be sufficiently slack to allow the roller E to move freely, as the surface of the ground may require.

The chains H are designed to assist in turning the rear roller, and to relieve the swivel-connection from the strain in turning, and should be of such a length as to prevent the frame F from ever coming in contact with the frame B when turning the machine.

I is the driver's seat, which is supported from the frame F in such a position as to be directly over the centre of the roller, thus equalizing the weight.

I claim as new, and desire to secure by Letters Patent—

1. The swivel-connection G, constructed substantially as herein shown and described, in combination with the frames B and F, as and for the purpose set forth.

2. The combination and arrangement of the tongue A, frame B, frames D, rollers or cylinders C, chains H, swivel-connection G, frame F, and roller E, with each other, substantially as herein shown and described, and for the purposes set forth.

NEAL S. McLAY.

Witnesses:
    J. V. OFFENBACHER,
    JOHN McLAY.